United States Patent
Matsubayashi et al.

(10) Patent No.: US 10,056,810 B2
(45) Date of Patent: Aug. 21, 2018

(54) APPARATUS FOR INSPECTING LAMINATED IRON CORE AND METHOD FOR INSPECTING LAMINATED IRON CORE

(71) Applicant: MITSUI HIGH-TEC, INC., Kitakyushu-shi, Fukuoka (JP)

(72) Inventors: Satoshi Matsubayashi, Fukuoka (JP); Jin Oda, Fukuoka (JP); Masumori Toyonaga, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 178 days.

(21) Appl. No.: 15/170,012

(22) Filed: Jun. 1, 2016

(65) Prior Publication Data

US 2016/0356672 A1 Dec. 8, 2016

(30) Foreign Application Priority Data

Jun. 5, 2015 (JP) ................. 2015-115013

(51) Int. Cl.
*H02K 15/00* (2006.01)
*H02K 15/02* (2006.01)

(52) U.S. Cl.
CPC ........... *H02K 15/024* (2013.01); *H02K 15/00* (2013.01); *H02K 15/02* (2013.01)

(58) Field of Classification Search
USPC ...................................... 73/112.01
See application file for complete search history.

(56) References Cited

U.S. PATENT DOCUMENTS

| 5,208,503 | A | * | 5/1993 | Hisey | H02K 1/16 310/216.007 |
| 5,777,730 | A | * | 7/1998 | Dunlap | G01B 11/12 356/237.1 |
| 6,098,472 | A | * | 8/2000 | Addison | G01B 5/12 33/548 |
| 7,208,971 | B2 | * | 4/2007 | Lee | G01N 27/83 324/750.25 |
| 2012/0019097 | A1 | * | 1/2012 | Kwon | H02K 1/28 310/216.116 |
| 2014/0041207 | A1 | * | 2/2014 | Matsushita | H02K 15/028 29/598 |

FOREIGN PATENT DOCUMENTS

JP 5094086 9/2012

* cited by examiner

*Primary Examiner* — Manish S Shah
*Assistant Examiner* — Jean Morello
(74) *Attorney, Agent, or Firm* — Greenblum & Bernstein, P.L.C.

(57) ABSTRACT

There is provided an apparatus for inspecting a laminated iron core in which a plurality of iron core pieces are laminated. The apparatus includes an insertion jig being movable in a lamination direction of the laminated iron core along an inspection side surface of the laminated iron core while having a gap between the insertion jig and the inspection side surface of the laminated iron core, and a detecting sensor provided on the insertion jig and detecting a contact of the moving insertion jig with a projection which occurs on the inspection side surface of the laminated iron core.

12 Claims, 6 Drawing Sheets

APPARATUS FOR INSPECTING LAMINATED IRON CORE AND METHOD FOR INSPECTING LAMINATED IRON CORE

CROSS REFERENCE TO RELATED APPLICATION(S)

This application is based upon and claims the benefit of priority of Japanese Patent Application No. 2015-115013 filed on Jun. 5, 2015, the contents of which are incorporated herein by reference in its entirety.

BACKGROUND OF THE INVENTION

1. Field of the Invention

The present invention relates to an apparatus for inspecting a laminated iron core formed by laminating a plurality of iron core pieces with predetermined shapes, and a method for inspecting the laminated iron core.

2. Description of the Related Art

In a laminated iron core, for example, as described in Japanese Patent No. 5094086 referred to as Patent Reference 1, a thin metal sheet is sequentially fed to a die unit, and a shaft hole of the center of the thin metal sheet is blanked and then, a slot for forming a magnetic pole piece is blanked. A caulking part for joining vertically adjacent iron core pieces is formed, and these iron core pieces are blanked off and are laminated inside a die to thereby manufacture the laminated iron core. Thereafter, the following inspections (quality inspections) of the presence or absence of defects in quality are conducted, and the laminated iron core is shipped. The inspections are as follows: (1) a positional displacement of the blanked iron core piece due to a mistake in feeding of the thin metal sheet, (2) a bite of a foreign substance at the time of laminating the iron core pieces, and (3) a stack displacement of unit laminated iron cores in the case of welding the plural stacked unit laminated iron cores formed by laminating the plural iron core pieces.

Figure 6A:
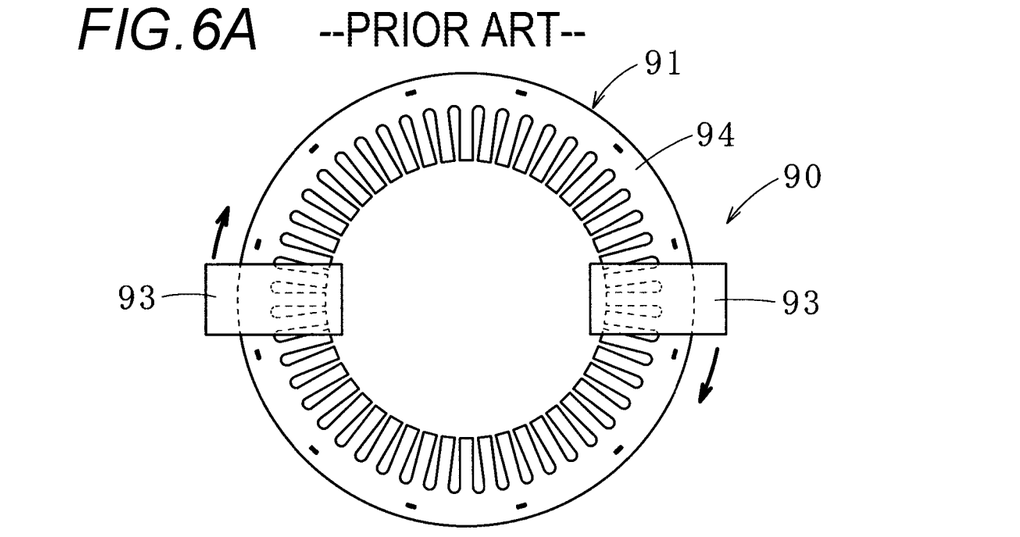
FIGS. 6A and 6B are respectively a plan view and a sectional side view of an apparatus for inspecting a laminated iron core according to a conventional example.
Figure 6B:
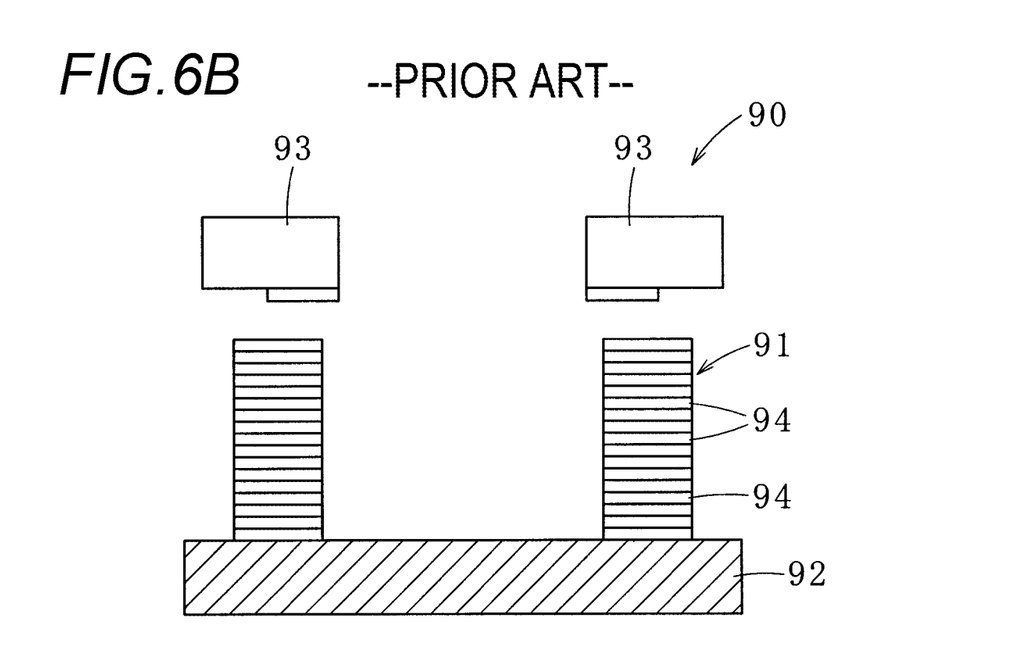

In the quality inspections described above, for example, an image inspecting apparatus 90 shown in FIGS. 6A and 6B is used. This image inspecting apparatus 90 includes a placement table 92 on which a laminated iron core 91 is placed, and two image cameras 93 for detecting a defect in quality.

In the case of using the image inspecting apparatus 90, after the two image cameras 93 are arranged over the laminated iron cores 91 so that each of the image cameras 93 overlaps with the laminated iron core 91 placed on the placement table 92 in plan view, the laminated iron ore 91 or the image camera 93 is rotated around the shaft center of the laminated iron core 91.

Patent Reference 1: Japanese Patent No. 5094086

SUMMARY OF THE INVENTION

However, in the case of using the image camera 93, unless detection power of the image camera 93 is increased, accuracy of detection of the defect in quality is decreased and the defect in quality may be omitted from the detection. As a result, when the detection power is low, subsequent inspection time by a worker becomes long to cause deterioration in workability or a decrease in work efficiency.

On the other hand, when the detection power of the image camera 93 is increased, an inclination of the laminated iron core 91 due to laminated iron core pieces 94 may be detected, and the defect in quality tends to be detected excessively. As a result, it becomes necessary for the worker to again inspect the defect in quality, and the work efficiency is decreased.

Also, in the quality inspections of a large number of laminated iron cores 91 produced, because of detection time by the image camera 93 and inspection time (cycle time) necessary for the one laminated iron core 91, it is also necessary to increase the number of image cameras 93 installed, but the image camera 93 is expensive, with the result that an equipment cost is high.

The present invention has been implemented in view of such circumstances, and a non-limited object of the present invention is to provide an apparatus for inspecting a laminated iron core and a method for inspecting the laminated iron core, capable of conducting a quality inspection economically with good workability without decreasing work efficiency.

A first aspect of the present invention provides an apparatus for inspecting a laminated iron core in which a plurality of iron core pieces are laminated, the apparatus including: an insertion jig being movable in a lamination direction of the laminated iron core along an inspection side surface of the laminated iron core while having a gap between the insertion jig and the inspection side surface of the laminated iron core; and a detecting sensor provided on the insertion jig and detecting a contact of the moving insertion jig with a projection which occurs on the inspection side surface of the laminated iron core.

The apparatus according to the first aspect of the present invention may be configured such that the laminated iron core includes a stack of a plurality of unit laminated iron cores formed by laminating the plurality of iron core pieces, a thickness of the insertion jig is smaller than a thickness of the one unit laminated iron core, and the insertion jig is adjusted to maintain the gap between the insertion jig and the inspection side surface when the insertion jig is moved along the inspection side surface of each of the unit laminated iron cores.

The apparatus according to the first aspect of the present invention may be configured such that the apparatus further includes a placement table on which the laminated iron core is placed, and the placement table has a shape equal to a contour shape of the inspection side surface in plan view, and the insertion jig passes inside or outside the placement table.

The apparatus according to the first aspect of the present invention may be configured such that the detecting sensor is a load sensor capable of detecting a resistance load at a time when the insertion jig makes contact with the projection.

The apparatus according to the first aspect of the present invention may be configured such that the laminated iron core is a stator iron core including a plurality of magnetic pole parts on an inner peripheral side, and the inspection side surface is constructed of a groove part formed by the adjacent magnetic pole parts and a distal end surface of each of the magnetic pole parts, and the insertion jig includes an insertion part for an internal shape formed in a circular shape in plan view, an outside surface of the insertion part for the internal shape having a gap with the distal end surface of each of the magnetic pole parts, and the insertion jig includes an insertion part for a magnetic pole formed on an outer periphery of the insertion part for the internal shape and positioned inside the groove part in plan view, an outside surface of the insertion part for the magnetic pole having a gap with each of the groove parts.

The apparatus according to the first aspect of the present invention may be configured such that the laminated iron core is a stator iron core including a plurality of magnetic pole parts on an outer peripheral side, and the inspection side surface is constructed of a groove part formed by the adjacent magnetic pole parts and a distal end surface of each of the magnetic pole parts, and the insertion jig includes an insertion part for an external shape formed in an annular shape in plan view, an inside surface of the insertion part for the external shape having a gap with the distal end surface of each of the magnetic pole parts, and the insertion jig includes an insertion part for a magnetic pole formed on an inner periphery of the insertion part for the external shape and positioned inside the groove part in plan view, an outside surface of the insertion part for the magnetic pole having a gap with each of the groove parts.

The apparatus according to the first aspect of the present invention may be configured such that a bolt hole is formed through the laminated iron core, and the insertion jig further includes an insertion part for the bolt hole positioned inside the bolt hole in plan view, an outside surface of the insertion part for the bolt hole having a gap with an inside surface of the bolt hole.

The apparatus according to the first aspect of the present invention may be configured such that the laminated iron core is an annular rotor iron core with a plurality of magnet-insert holes formed in a circumferential direction, and the inspection side surface is constructed of an inside surface of the laminated iron core and an inside surface of each of the magnet-insert holes, and the insertion jig includes an insertion part for an internal shape formed in a circular shape in plan view, an outside surface of the insertion part for the internal shape having a gap with the inside surface of the laminated iron core, and the insertion jig includes an insertion part for the magnet-insert hole positioned inside the magnet-insert hole in plan view, an outside surface of the insertion part for the magnet-insert hole having a gap with the inside surface of each of the magnet-insert holes.

The apparatus according to the first aspect of the present invention may be configured such that a weight reduction hole is formed through the laminated iron core, and the insertion jig further includes an insertion part for the weight reduction hole positioned inside the weight reduction hole in plan view, an outside surface of the insertion part for the weight reduction hole having a gap with an inside surface of the weight reduction hole.

A second aspect of the present invention provides a method for inspecting a laminated iron core in which a plurality of iron core pieces are laminated, the method including: moving an insertion jig in a lamination direction of the laminated iron core along an inspection side surface of the laminated iron core while having a gap between the insertion jig and the inspection side surface of the laminated iron core; and detecting, with a detecting sensor formed on the insertion jig, a contact of the insertion jig with a projection which occurs on the inspection side surface of the laminated iron core.

The method according to the second aspect of the present invention may be configured such that the laminated iron core includes a stack of a plurality of unit laminated iron cores formed by laminating the plurality of iron core pieces, a thickness of the insertion jig is smaller than a thickness of the one unit laminated iron core, and the insertion jig is adjusted to maintain the gap between the insertion jig and the inspection side surface when the insertion jig is moved along the inspection side surface of each of the unit laminated iron cores.

The method according to the second aspect of the present invention may be configured such that the laminated iron core is placed on a placement table having a shape equal to a contour shape of the inspection side surface in plan view, and then, the insertion jig is moved inside or outside the placement table.

In the apparatus for inspecting the laminated iron core and the method for inspecting the laminated iron core according to the aspects of the present invention, the insertion jig is moved along the inspection side surface targeted for the inspection of the laminated iron core, and the detecting sensor detects the contact of the insertion jig with the projection when this insertion jig makes contact with the projection occurring on the inspection side surface, with the result that a defect in quality can surely be detected by a simple configuration.

Consequently, quality inspection can be conducted economically with good workability without decreasing work efficiency.

Also, when the thickness of the insertion jig is smaller than the thickness of the one unit laminated iron core and the position of the gap between the insertion jig and the inspection side surface can be adjusted, in quality inspection of the laminated iron core formed by stacking the plural unit laminated iron cores, a position of the insertion jig can be adjusted according to the inspection side surface every time the insertion jig is moved along the inspection side surface of each of the unit laminated iron cores. Accordingly, even when an inclination of each of the unit laminated iron cores occurs, a defect in quality of each of the unit laminated iron cores can be detected with high accuracy.

When the laminated iron core is placed on the placement table having the shape equal to the contour shape of the inspection side surface in plan view and then the insertion jig is moved inside or outside the placement table, after a position of the insertion jig is adjusted by the placement table, the quality inspection of the laminated iron core can be subsequently conducted. Accordingly, the insertion jig can be prevented from colliding with the laminated iron core in the case of the quality inspection of the laminated iron core.

DETAILED DESCRIPTION OF THE EXEMPLARY EMBODIMENTS

Subsequently, an embodiment embodying the present invention will be described with reference to the accompanying drawings, and the present invention will be understood.

Figure 1A:
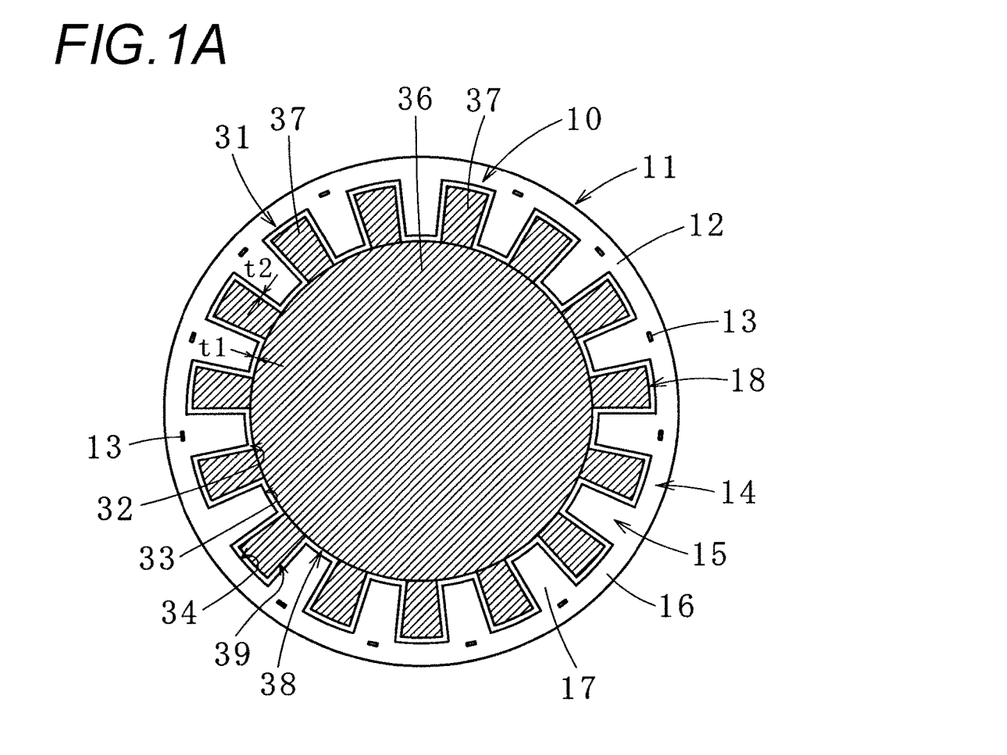
FIGS. 1A and 1B are respectively a plan view and a sectional side view of an apparatus for inspecting a laminated iron core according to one embodiment of the present invention.

First, a laminated iron core 11 for which quality inspection is conducted using an apparatus (hereinafter simply also called an inspecting apparatus) 10 for inspecting the laminated iron core according to one embodiment of the present invention will be described with reference to FIGS. 1A and 1B.

The laminated iron core 11 is a stator iron core (stator) used in an inner rotor type.

This laminated iron core 11 is formed by laminating plural annular iron core pieces 12.

The iron core piece 12 has an annular integral structure, but may have a divided structure capable of annularly joining plural circularly arcuate iron core piece parts, or a structure capable of connecting a part of the plural circularly arcuate iron core piece parts in a circumferential direction by a joining part and folding this joining part to be formed in an annular shape.

The iron core piece 12 is blanked and formed from a strip material (thin metal sheet) made of, for example, an amorphous material or an electromagnetic steel plate with a thickness of about 0.10 to 0.5 mm. In addition, the iron core piece may be a piece blanked from one strip material, or a piece blanked from plural (for example, two, or three or more) stacked strip materials.

The iron core pieces 12 adjacent in a lamination direction are mutually joined by caulking part 13, but can also be joined using any one or two or more of caulking, a resin (a thermosetting resin (for example, an epoxy resin) or a thermoplastic resin), and welding.

The laminated iron core 11 has an annular yoke part 14, and plural magnetic pole parts 15 connected integrally to an inner peripheral side of this yoke part 14.

The yoke part 14 and the magnetic pole parts 15 are respectively formed by laminating the plural iron core pieces 12 having yoke piece parts 16 and magnetic pole piece parts 17. This magnetic pole piece part 17 is formed by blanking a slot 18 from the strip material.

In addition, the stator iron core used in the inner rotor type includes the following iron core.

Figure 2:
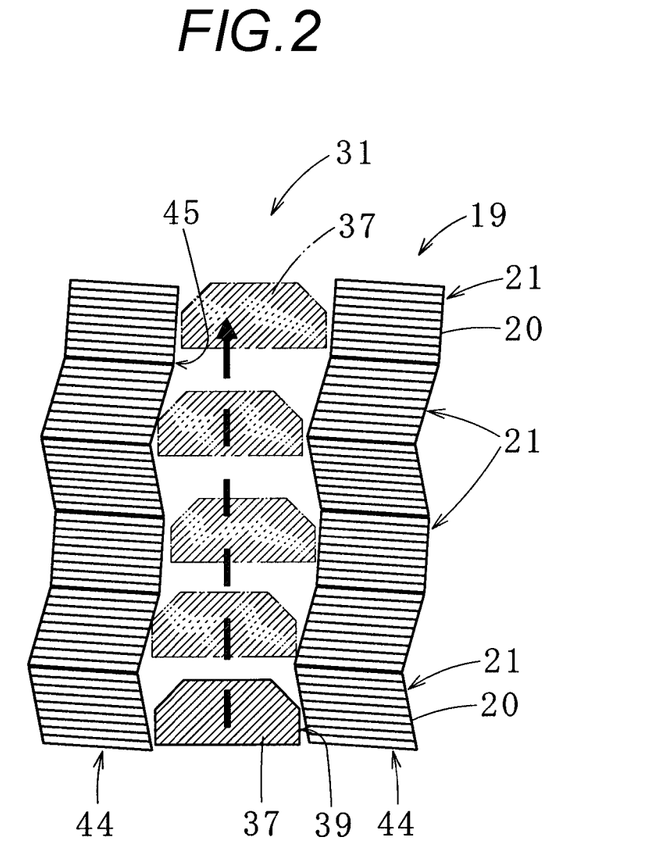
FIG. 2 is an explanatory diagram of a use state of an insertion jig according to a first modified example.

A laminated iron core 19 shown in FIG. 2 is formed by stacking two or more (six herein) unit laminated iron cores 21 formed by laminating plural iron core pieces 20. This iron core piece 20 is similar to the annular iron core piece 12, but may have the structure in which the joining part of connecting the plural circularly arcuate iron core piece parts is folded to be formed in the annular shape described above.

Figure 3A:
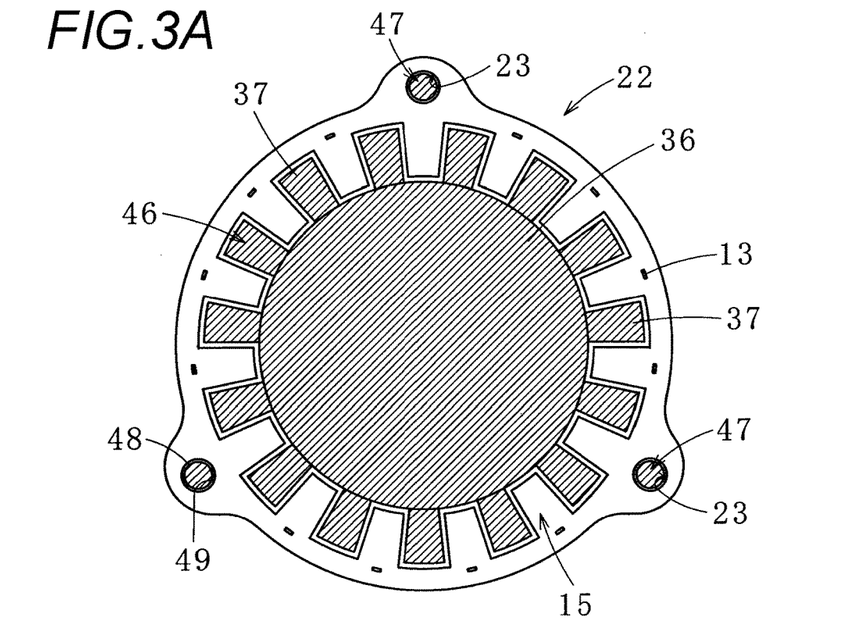
FIGS. 3A and 3B are respectively plan views of insertion jigs according to second and third modified examples.

Also, a laminated iron core 22 shown in FIG. 3A is formed with bolt holes 23 used in the case of bolting this laminated iron core 22 to a case component (not shown).

Figure 3B:
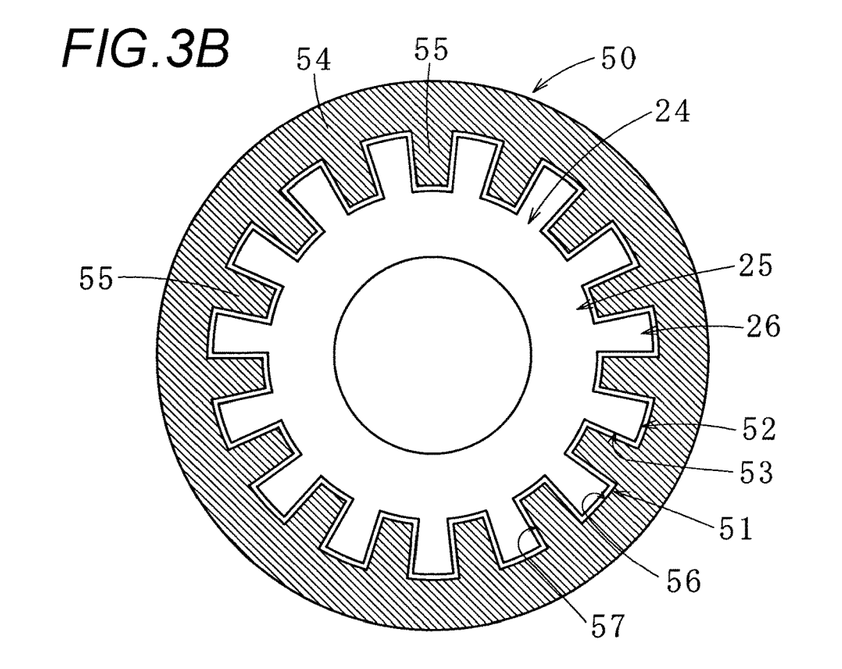
Figure 4:
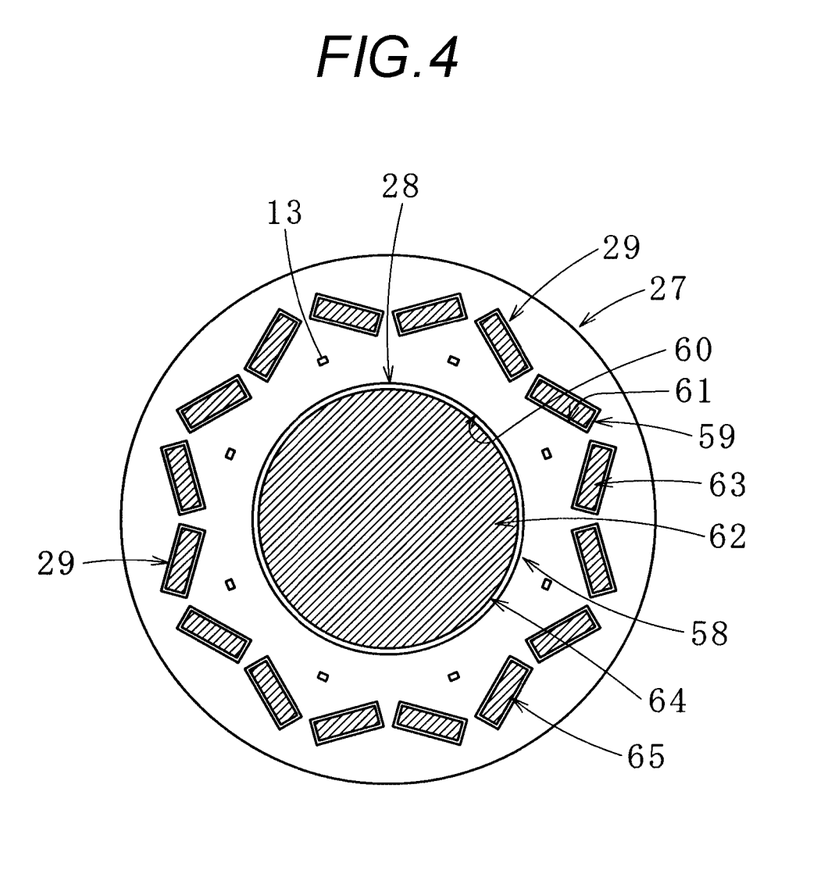
FIG. 4 is a plan view of an insertion jig according to a fourth modified example.

The laminated iron core includes iron cores shown in FIGS. 3B and 4.

A laminated iron core 24 shown in FIG. 3B is a stator iron core (stator) used in an outer rotor type.

This laminated iron core 24 has an annular yoke part 25, and plural magnetic pole parts 26 connected integrally to an outer peripheral side of this yoke part 25, and except this structure, the laminated iron core 24 is similar to the laminated iron core 11.

A laminated iron core 27 shown in FIG. 4 is a rotor iron core (rotor) used in an inner rotor type.

The laminated iron core 27 is formed in an annular shape, and the center of the laminated iron core 27 is formed with a shaft hole (shaft hole) 28, and plural magnet-insert holes 29, for permanent magnets (not shown), made of through holes farmed in a lamination direction of the laminated iron core 27 are formed in the periphery (circumferentially) around this shaft hole 28. The permanent magnet could be fixed into this magnet-insert hole 29 using the resin described above.

This laminated iron core 27 is also blanked and formed from the strip material described above, and except its shape, the laminated iron core 27 is similar to the laminated iron core 11.

In addition, plural weight reduction holes (through holes) can be formed through the laminated iron core 27 in a circumferential direction of the laminated iron core 27.

Further, the laminated iron core includes a rotor iron core (rotor) used in an outer rotor type with a configuration substantially similar to that of the laminated iron core 27.

Subsequently, the apparatus 10 for inspecting the laminated iron core according to one embodiment of the present invention will be described with reference to FIGS. 1A and 1B.

The inspecting apparatus 10 has a metallic placement table 30, a metallic insertion jig 31, and a load sensor (not shown) which is one example of a detecting sensor, and is an apparatus for detecting a projection (a portion projected from an inspection side surface 32 in plan view) occurring on the inspection side surface 32 targeted for inspection of the laminated iron core 11, resulting from, for example, a positional displacement of the blanked iron core piece 12 or a bite of a foreign substance at the time of laminating the iron core pieces 12. In addition, the inspection side surface 32 of the laminated iron core 11 is an inner surface of a groove part (recess) 34 formed by the adjacent magnetic pole parts 15 and a distal end surface 33 of each of the magnetic pole parts 15.

The placement table 30 is a table on which the laminated iron core 11 can be placed, and has an opening into which the insertion jig 31 can be passed (inserted) inside the placement table 30, and a contour shape of an inside surface 35 of its opening becomes equal to a contour shape of the inspection side surface 32 in plan view.

In addition, the shape of the placement table 30 is not limited to this shape, and when the insertion jig 31 is passed, the shape of the opening into which the insertion jig 31 is passed may be formed in a shape larger than the contour shape of the inspection side surface 32 in plan view, and when the insertion jig 31 is not passed, the shape can also be formed in a shape in which the opening is not formed.

The insertion jig 31 includes an insertion part 36 for an internal shape formed in a circular shape (disk shape) in plan view, and plural insertion parts 37 for magnetic poles formed at equal pitches on an outer periphery of this insertion part 36 for the internal shape, and its contour shape is similar to the contour shape of the inspection side surface 32 of the laminated iron core 11.

An outside surface 38 of the insertion part 36 for the internal shape has a gap t1 with the distal end surface 33 of each of the magnetic pole parts 15. Also, each of the insertion parts 37 for the magnetic poles is positioned inside the groove part 34 (slot 18) in plan view, and an outside surface (outer peripheral surface) 39 of each of the insertion parts 37 has a gap t2 with the inner surface of each of the groove parts 34.

Each of the gaps t1, t2 is set, for example, according to product quality requested by a customer, and is about 70 μm or less (preferably 50 μm or less, more preferably 30 μm or less). In addition, a lower limit value of each of the gaps t1, t2 is not particularly limited, and is, for example, about 10 μm.

This insertion jig 31 can be attached to and detached from an upward and downward movement table (upward and downward movement mechanism) 40, and always waits in a height position equal to the placement table 30 or a position lower than the placement table 30. Accordingly, the insertion jig 31 passes through the inside of the placement table 30 and can be upwardly and downwardly moved (can be moved), with the result that a position of the insertion jig 31 is adjusted by the placement table 30, and the insertion jig 31 can be prevented from colliding with the laminated iron core 11 at the time of upwardly and downwardly moving the insertion jig 31.

Also, an upper side corner and a lower side corner of the insertion jig 31 (the insertion part 36 for the internal shape and each of the insertion parts 37 for the magnetic poles) are tapered (chamfered). Accordingly, the insertion jig 31 can be inhibited and further prevented from catching on the laminated iron core 11 (inspection side surface 32) at the time of upwardly and downwardly moving the insertion jig 31.

The load sensor is a load cell formed in the insertion jig 31 (for example, between the insertion jig 31 and the upward and downward movement table 40), and is a tool for detecting a projection occurring on the inspection side surface 32 of the laminated iron core 11. In use, a resistance load is detected by contact between the projection and the moved insertion jig 31 (the insertion part 36 for the internal shape and/or each of the insertion parts 37 for the magnetic poles) when the projection occurs on the inspection side surface 32, and it is decided that the projection occurs when this resistance load exceeds a preset load.

In addition, the number of load sensors installed may be one, or two or more depending on the size of the insertion jig. Also, as long as it can be detected that the insertion jig 31 makes contact with the projection, the detecting sensor other than the load sensor can be used.

By the configuration described above, the insertion jig 31 can be moved in the lamination direction of the laminated iron core 11 along the inspection side surface 32 in a state having the gaps t1, t2 with the inspection side surface 32 of the laminated iron core 11 by operating the upward and downward movement table 40. This upward and downward movement table 40 is operated by a control part (not shown).

Figure 1B:
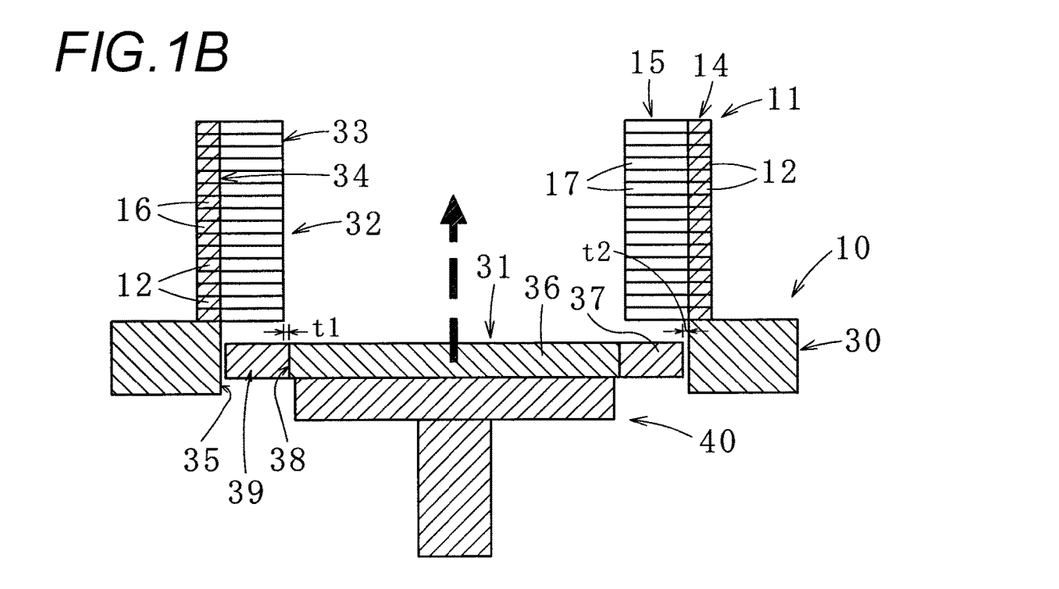
Figure 5:
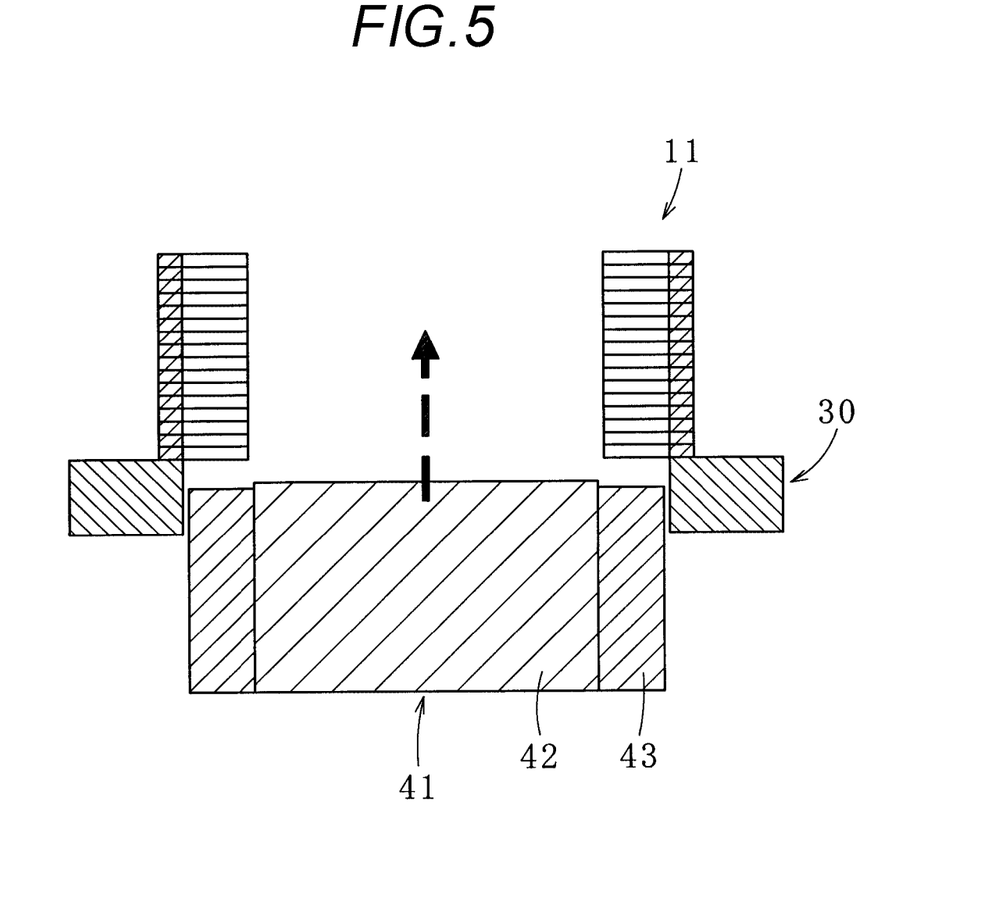
FIG. 5 is a sectional side view of an insertion jig according to a fifth modified example.

In addition, the insertion jig 31 is thinned as shown in FIG. 1B, but can also be thickened like an insertion jig 41 (an insertion part 42 for an internal shape and an insertion part 43 for a magnetic pole) shown in FIG. 5. This insertion jig 41 has a configuration substantially similar to that of the insertion jig 31 except that the thickness differs.

The thinned insertion jig 31 is particularly useful for quality inspection of the laminated iron core 19 shown in FIG. 2.

In the case of stacking the plural unit laminated iron cores 21 as shown in the laminated iron core 19, when the thinned insertion jig 31 is upwardly moved straight, or when the thickened insertion jig 41 is upwardly moved, a size of a gap between the insertion part 37, 43 for the magnetic pole and both side surfaces (side surfaces of magnetic pole parts 44) of a groove part 45 formed by the adjacent magnetic pole parts 44 constructing the laminated iron core 19 varies irregularly in the lamination direction of the laminated iron core 19.

This is due to a stack displacement in the case of stacking the plural unit laminated iron cores 21 and an inclination of the laminated iron core 19 caused by the laminated iron core pieces 20. Note that FIG. 2 excessively illustrates the inclination of the laminated iron core 19 for convenience of description.

As a result, even when each of the unit laminated iron cores 21 has no defect in quality, it may be decided that each of the unit laminated iron cores 21 has a defect in quality clue to the inclination of the laminated iron core 19, and accuracy of detection of the defect in quality in each of the unit laminated iron cores 21 is decreased.

Hence, in such a case, a thickness of the disk-shaped insertion jig 31 is made smaller (for example, by about 5 to 10 mm) than a thickness of one unit laminated iron core 21 and the insertion jig 31 is enabled to be rotated (swung) around the shaft center. In addition, a method for rotating the insertion jig 31 is achieved, for example, by forming bearings on a lower portion of the upward and downward movement table 40 shown in FIG. 1B.

Accordingly, the insertion parts 37 for the magnetic poles of the insertion jig 31 can be rotated (can be swung horizontally between the adjacent magnetic pole parts 37) around the shaft center of the insertion jig 31.

By the configuration described above, when the insertion jig 31 is moved along the inspection side surface of each of the unit laminated iron cores 21, the gap between the insertion part 37 for the magnetic pole and the inspection side surface (both side surfaces of the groove part 45) can be maintained according to the inclination of the laminated iron core 19, with the result that accuracy of detection of the defect in quality can be increased.

In addition, when a stack displacement of the plural unit laminated iron cores 21 is large to the extent that the displacement leads to the defect in quality the unit laminated iron cores 21 naturally obstruct upward movement of the insertion jig 31, with the result that the defect in quality can be detected.

Also, in quality inspection of the laminated iron core 22 shown in FIG. 3A, an insertion jig 46 can be used instead of the insertion jig 31.

The insertion jig 46 is provided with insertion parts 47 for bolt holes in addition to the configuration (the insertion part 36 for the internal shape and the insertion parts 37 for the magnetic poles) of the insertion jig 31. This insertion part 47 for the bolt hole has a columnar shape with a length longer than a lamination thickness of the laminated iron core 22, and is positioned inside the bolt hole 23 in plan view, and an outside surface 48 of the insertion part 47 has a gap (substantially equal to the gaps t1, t2 described above) with an inside surface 49 of the bolt hole 23. That is, the inspection side surface targeted for inspection of the laminated iron core 22 also includes the inside surface 49 of the bolt hole 23.

The insertion part 47 for the bolt hole is erected on an upward and downward movement table (having a function similar to that of the upward and downward movement table 40), and an upper side corner of the insertion part 47 is tapered.

Accordingly, the insertion part 47 for the bolt hole can inspect a penetration state (quality) of the bolt hole 23 by being upwardly and downwardly moved along the inside surface 49 while having the gap with the inside surface 49 of the bolt hole 23 by operating the upward and downward movement table. Also, since the insertion part 47 for the bolt hole passes through the inside of the bolt hole 23, when there is a foreign substance inside the bolt hole 23, the insertion part 47 also has a function of removing this foreign substance.

This insertion part 47 for the bolt hole can be upwardly and downwardly moved inside the bolt hole 23 by an upward and downward movement table different from that of the insertion part 36 for the internal shape, but is preferably formed on the upward and downward movement table 40 provided with the insertion part 36 for the internal shape. In this case, the insertion part 36 for the internal shape could be attached and fixed to the upward and downward movement table 40 through a support part so that the upper end of the insertion part 36 is positioned in a height substantially equal to the upper end of the insertion part 47 for the bolt hole.

Accordingly, since the inside surface 49 of the bolt hole 23 and the inner surface of each of the groove part 34 and the distal end surface 33 of each of the magnetic pole parts 15 constructing the laminated iron core 22 can simultaneously be inspected by operating the upward and downward movement table 40, work efficiency can be increased.

And, in quality inspection of the laminated iron core 24 shown in FIG. 3B, an insertion jig 50 can be used instead of the insertion jig 31. An inspection side surface 51 of this laminated iron core 24 is an inner surface of a groove part 53 formed by the adjacent magnetic pole parts 26 and a distal end surface 52 of each of the magnetic pole parts 26.

The insertion jig 50 includes an insertion part 54 for an external shape formed in an annular shape in plan view, and plural insertion parts 55 for magnetic poles formed at equal pitches on an inner periphery of this insertion part 54 for the external shape. An inside surface 56 of the insertion part 54 for the external shape has a gap a with the distal end surface 52 of each of the magnetic pole parts 26, and each of the insertion parts 55 for the magnetic poles is positioned inside the groove part 53 in plan view, and an outside surface 57 of each of the insertion parts 55 has a gap t2 with the inner surface of each of the groove parts 53.

A placement table of this laminated iron core 24 differs from the placement table 30 in shape.

The insertion jig 50 can pass (can be inserted) outside the placement table, and a contour shape of an outside surface of the placement table becomes equal to a contour shape of the inspection side surface 51 in plan view.

In addition, the shape of the placement table is not limited to this shape, and when the insertion jig 50 is not passed, the shape can also be formed in a shape larger than the contour shape of the inspection side surface 51 in plan view.

Further, in quality inspection of the laminated iron core 27 shown in FIG. 4, an insertion jig 58 can be used instead of the insertion jig 31. An inspection side surface 59 of this laminated iron core 27 is an inside surface 60 of the laminated iron core 27 (shaft hole 28) and an inside surface 61 of the magnet-insert hole 29.

The insertion jig 58 includes a (columnar-shaped) insertion part 62 for an internal shape formed in a circular shape in plan view, and a (quadrangular prism-shaped) insertion part 63 for a magnet-insert hole positioned inside the magnet-insert hole 29. An outside surface 64 of the insertion part 62 for the internal shape has a gap t1 with the inside surface 60 of the laminated iron core 27, and an outside surface 65 of each of the insertion parts 63 for the magnet-insert holes has a gap t2 with the inside surface 61 of the magnet-insert hole 29.

Both of the insertion part 62 for the internal shape and the insertion part 63 for the magnet-insert hole are erected on an upward and downward movement table (having a function similar to that of the upward and downward movement table 40), and a length of each of the insertion parts is longer than a lamination thickness of the laminated iron core 27, and an upper side corner of each of the insertion parts is tapered.

Each of the insertion part for the internal shape and the insertion part for the magnet-insert hole is formed in, for example, a plate shape, and can also be attached and fixed to the upward and downward movement table through a support part so that a height position from the upward and downward movement table becomes a position higher than the lamination thickness of the laminated iron core 27.

In addition, when a weight reduction hole made of a through hole is formed through the laminated iron core, the insertion jig 58 (the insertion part 62 for the internal shape and the insertion part 63 for the magnet-insert hole) further includes an insertion part for the weight reduction hole. That is, the inspection side surface targeted for inspection of the laminated iron core also includes an inside surface of the weight reduction hole.

This insertion part for the weight reduction hole has a bar shape with a length longer than a lamination thickness of the laminated iron core, and is positioned inside the weight reduction hole in plan view, and an outside surface of the insertion part has a gap (substantially equal to the gaps t1, t2 described above) with an inside surface of the weight reduction hole.

Next, a method for inspecting the laminated iron core according to one embodiment of the present invention will be described with reference to FIGS. 1A and 1B using the laminated iron core 11 and the apparatus 10 for inspecting the laminated iron core described above.

First, the laminated iron core 11 in which the plural iron core pieces 12 are laminated is arranged on the placement table 30. This laminated iron core 11 is arranged so that a contour shape of the inspection side surface 32 of the laminated iron core 11 matches with a contour shape of the inside surface 35 of the placement table 30.

Next, the upward and downward movement table 40 is operated by a control part, and the insertion jig 31 waiting in a height position equal to that of the placement table 30 or in a position lower than that of the placement table 30 is upwardly moved while passing through the inside of the placement table 30.

Accordingly, the insertion jig 31 can be upwardly moved in the lamination direction of the laminated iron core 11 along the inspection side surface 32 while having the gaps t1, t2 with the inspection side surface 32 (the distal end surface 33 of each of the magnetic pole parts 15 and the inner surface of each of the groove parts 34) of the laminated iron core 11.

Here, when a projection does not occur on the inspection side surface 32 of the laminated iron core 11 (it is decided that the laminated iron core 11 does not have a defect in quality), a load sensor does not detect an excessive resistance load (upward movement of the insertion jig 31 is not obstructed by the projection), and the insertion jig 31 is moved to an upper position of the laminated iron core 11.

As a result, after the insertion jig 31 moved to the upper position of the laminated iron core 11 is downwardly moved to a waiting position, the laminated iron core 11 is conveyed to the next process.

On the other hand, when the projection occurs on the inspection side surface 32 of the laminated iron core 11 (it is decided that the laminated iron core 11 has the defect in quality), the upward movement of the insertion jig 31 is obstructed by the projection, with the result that the load sensor detects the excessive resistance load. In addition, the control part notifies a worker that the laminated iron core 11 has the defect in quality.

As a result, after this insertion jig 31 is downwardly moved to the waiting position, for example, the worker repairs a defective portion of the laminated iron core 11 and conveys the laminated iron core 11 to the next process, or when the laminated iron core 11 cannot be repaired, the laminated iron core 11 is discarded as it is.

Thus, in quality inspection by the inspecting apparatus 10, the inspection side surface 32 of an inner peripheral side of the laminated iron core 11 is inspected, and a side surface of an outer peripheral side of the laminated iron core 11 is not inspected. However, since a width of the annular iron core piece 12 in a radial direction is equal in a circumferential direction of the iron core piece 12, for a stack displacement of the laminated iron core 11, an abnormality is detected on the inspection side surface 32 of the inner peripheral side when the abnormality is present on the side surface of the outer peripheral side.

In addition, quality inspections of the laminated iron cores 22, 24 and shown in FIGS. 3A, 3B and 4 can be conducted by a method substantially similar to the above.

Also, since the insertion jig 31 can be rotated around the shaft center in the laminated iron core 19 shown in FIG. 2, even when an inclination of the laminated iron core 19 occurs, a gap between the inspection side surface of the laminated iron core 19 and the outside surface 39 of the insertion part 37 for the magnetic pole of the insertion jig 31 can be maintained when the insertion jig 31 is moved along the inspection side surface of each of the unit laminated iron cores 21.

As can be seen from the above, the quality inspection can be conducted economically with good workability without decreasing work efficiency by using the apparatus for inspecting the laminated iron core and the method for inspecting the laminated iron core of the present invention.

The present invention has been described above with reference to the specific embodiment, but the present invention is not limited to the configuration described in the embodiment described above, and also includes other embodiments and modified examples contemplated within the scope of the subject matter in the present invention. For example, the case of constructing the apparatus for inspecting the laminated iron core and the method for inspecting the laminated iron core of the present invention by combining a part or all of the respective embodiments and modified examples described above is also included in the scope of right of the present invention.

Also, the embodiment described above describes the case of conducting the quality inspection of the laminated iron core by upwardly moving the insertion jig in the lamination direction of the laminated iron core along the side surface of the laminated iron core, but is not limited to this and, for example, while downwardly moving the insertion jig in the lamination direction of the laminated iron core along the side surface of the laminated iron core, the quality inspection of the laminated iron core can also be conducted. Also, when the laminated iron core is skewed, the quality inspection can be handled by obliquely upwardly or downwardly moving the insertion jig.

The embodiment described above describes the case of integrally forming the insertion part for the internal shape and the insertion parts for the magnetic poles (the same also applies to the insertion part for the external shape and the insertion parts for the magnetic poles) constructing the insertion jig, but can also have a configuration capable of attaching and detaching each of the insertion parts for the magnetic poles to and from the insertion part for the internal shape. Accordingly, since the insertion part for the internal shape and the insertion parts for the magnetic poles can be selected and used according to the shape of the laminated iron core, for example, it becomes unnecessary to prepare the insertion jig according to a kind of laminated iron core.

In addition, in this form, the same also applies to the insertion parts for the bolt holes, the insertion parts for the magnet-insert holes, and the insertion part for the weight reduction hole.

What is claimed is:

1. An apparatus for inspecting a laminated iron core in which a plurality of iron core pieces are laminated, the apparatus comprising:
   an insertion jig being movable in a lamination direction of the laminated iron core along an inspection side surface of the laminated iron core while having a gap between the insertion jig and the inspection side surface of the laminated iron core; and
   a detecting sensor provided on the insertion jig and detecting a contact of the moving insertion jig with a projection which occurs on the inspection side surface of the laminated iron core.

2. The apparatus according to claim 1, wherein the laminated iron core includes a stack of a plurality of unit laminated iron cores formed by laminating the plurality of iron core pieces,
   a thickness of the insertion jig is smaller than a thickness of the one unit laminated iron core, and
   the insertion jig is adjusted to maintain the gap between the insertion jig and the inspection side surface when the insertion jig is moved along the inspection side surface of each of the unit laminated iron cores.

3. The apparatus according to claim 1, further comprising:
   a placement table on which the laminated iron core is placed,
   the placement table has a shape equal to a contour shape of the inspection side surface in plan view, and the insertion jig passes inside or outside the placement table.

4. The apparatus according to claim 1, wherein the detecting sensor is a load sensor capable of detecting a resistance load at a time when the insertion jig makes contact with the projection.

5. The apparatus according to claim 1, wherein the laminated iron core is a stator iron core including a plurality of magnetic pole parts on an outer peripheral side, and the inspection side surface is constructed of a groove part formed by the adjacent magnetic pole parts and a distal end surface of each of the magnetic pole parts, and
   the insertion jig includes an insertion part for an external shape formed in an annular shape in plan view, an inside surface of the insertion part for the external shape having a gap with the distal end surface of each of the magnetic pole parts, and
   the insertion jig includes an insertion part for a magnetic pole formed on an inner periphery of the insertion part for the external shape and positioned inside the groove part in plan view, an outside surface of the insertion part for the magnetic pole having a gap with each of the groove parts.

6. The apparatus according to claim 1, wherein the laminated iron core is a stator iron core including a plurality of magnetic pole parts on an inner peripheral side, and the inspection side surface is constructed of a groove part formed by the adjacent magnetic pole parts and a distal end surface of each of the magnetic pole parts, and
   the insertion jig includes an insertion part for an internal shape formed in a circular shape in plan view, an outside surface of the insertion part for the internal shape having a gap with the distal end surface of each of the magnetic pole parts, and the insertion jig includes an insertion part for a magnetic pole formed on an outer periphery of the insertion part for the internal shape and positioned inside the groove part in plan view, an outside surface of the insertion part for the magnetic pole having a gap with each of the groove parts.

7. The apparatus according to claim 6, wherein a bolt hole is formed through the laminated iron core, and the insertion jig further includes an insertion part for the bolt hole positioned inside the bolt hole in plan view, an outside surface of the insertion part for the bolt hole having a gap with an inside surface of the bolt hole.

8. The apparatus according to claim 1, wherein the laminated iron core is an annular rotor iron core with a plurality of magnet-insert holes formed in a circumferential direction, and the inspection side surface is constructed of an inside surface of the laminated iron core and an inside surface of each of the magnet-insert holes, and the insertion jig includes an insertion part for an internal shape formed in a circular shape in plan view, an outside surface of the insertion part for the internal shape having a gap with the inside surface of the laminated iron core, and the insertion jig includes an insertion part for the magnet-insert hole positioned inside the magnet-insert hole in plan view, an outside surface of the insertion part for the magnet-insert hole having a gap with the inside surface of each of the magnet-insert holes.

9. The apparatus according to claim 8, wherein a weight reduction hole is formed through the laminated iron core, and the insertion jig further includes an insertion part for the weight reduction hole positioned inside the weight reduction hole in plan view, an outside surface of the insertion part for the weight reduction hole having a gap with an inside surface of the weight reduction hole.

10. A method for inspecting a laminated iron core in which a plurality of iron core pieces are laminated, the method comprising:

moving an insertion jig in a lamination direction of the laminated iron core along an inspection side surface of the laminated iron core while having a gap between the insertion jig and the inspection side surface of the laminated iron core; and detecting, with a detecting sensor formed on the insertion jig, a contact of the insertion jig with a projection which occurs on the inspection side surface of the laminated iron core.

11. The method according to claim 10, wherein the laminated iron core includes a stack of a plurality of unit laminated iron cores formed by laminating the plurality of iron core pieces, a thickness of the insertion jig is smaller than a thickness of the one unit laminated iron core, and the insertion jig is adjusted to maintain the gap between the insertion jig and the inspection side surface when the insertion jig is moved along the inspection side surface of each of the unit laminated iron cores.

12. The method according to claim 10, wherein the laminated iron core is placed on a placement table having a shape equal to a contour shape of the inspection side surface in plan view, and then, the insertion jig is moved inside or outside the placement table.

* * * * *